United States Patent
Junginger et al.

(10) Patent No.: US 12,545,969 B2
(45) Date of Patent: Feb. 10, 2026

(54) PROCESS FOR TANNING ANIMAL HIDE

(71) Applicant: University of Lancaster, Lancaster (GB)

(72) Inventors: Tobias Junginger, Victoria (CA); Robert Apsimon, Daresbury (GB); Rebecca Seviour, Huddersfield (GB)

(73) Assignee: University of Lancaster, Lancaster (GB)

( * ) Notice: Subject to any disclaimer, the term of this patent is extended or adjusted under 35 U.S.C. 154(b) by 972 days.

(21) Appl. No.: 17/768,583

(22) PCT Filed: Oct. 14, 2020

(86) PCT No.: PCT/GB2020/052552
§ 371 (c)(1),
(2) Date: Apr. 13, 2022

(87) PCT Pub. No.: WO2021/074607
PCT Pub. Date: Apr. 22, 2021

(65) Prior Publication Data
US 2024/0102117 A1    Mar. 28, 2024

(30) Foreign Application Priority Data

Oct. 15, 2019   (GB) ..................... 1914917

(51) Int. Cl.
*D06P 3/32* (2006.01)
*C14C 3/30* (2006.01)
*D06P 5/20* (2006.01)

(52) U.S. Cl.
CPC .................. *C14C 3/30* (2013.01); *D06P 3/32* (2013.01); *D06P 5/2005* (2013.01)

(58) Field of Classification Search
CPC ............. C14C 3/30; D06P 3/32; D06P 5/2005
USPC ...................................................... 8/94.19 R
See application file for complete search history.

(56) References Cited

U.S. PATENT DOCUMENTS 5,096,553 A * 3/1992 Ross .......................... C14C 1/02
                                                          8/94.1 R

FOREIGN PATENT DOCUMENTS

| | | |
|---|---|---|
| CA | 1270224 | 6/1990 |
| CN | 107619892 | 1/2018 |
| CN | 108559806 | 9/2018 |
| CN | 107488760 | 2/2020 |
| DE | 102013019755 | 5/2015 |
| EP | 3656878 | 5/2020 |
| GB | 675237 | 7/1952 |
| SU | 867938 | 9/1981 |

OTHER PUBLICATIONS

Klára Drábková, Michal Ďurovič, Irena Kučerová, Influence of gamma radiation on properties of paper and textile fibres during disinfection, Radiation Physics and Chemistry, vol. 152, 2018, p. 75-80.*
Conference on Ecologically Sustainable Industrial Development. Copenhagen, Denmark. 1991.*
Herman (Treatment and Processing of Leather Materials Using Gamma Irradiation. ICAMS 2018—7th International Conference on Advanced Materials and Systems).*
Search Report issued on GB1914917.8, dated May 7, 2020.
International Search Report and Written Opinion for PCT/GB2020/052552, mailed Feb. 8, 2021.

* cited by examiner

*Primary Examiner* — Amina S Khan
(74) *Attorney, Agent, or Firm* — Bell & Manning, LLC (57) ABSTRACT

There is provided a process for tanning animal hide comprising treating an animal hide with at least one tanning agent and exposing the treated hide to a dose of ionising radiation of from 1 to 500 kJ/kg wherein the ionising radiation is in the form of a charged particle beam.

18 Claims, 3 Drawing Sheets

PROCESS FOR TANNING ANIMAL HIDE

This application is a National Stage of International Application No. PCT/GB2020/052552, filed Oct. 14, 2020, which claims the benefit of GB Patent Application No. 1914917.8, filed Oct. 15, 2019, the contents of both of which are herein incorporated by reference.

The present invention relates to a process and system for tanning animal hide to produce leather.

BACKGROUND TO THE DISCLOSURE

Leather production is an industry with an estimated global turnover of over £100 billion. The production process is highly versatile and tanneries often tailor the process to the needs of the customer to provide the required leather characteristics. After the animal is slaughtered and the raw animal hide removed, it is cured to prevent biological degradation before it can be transported to a tannery and processed into tanned leather. Upon arrival at the tannery, the hides undergo a series of steps, known collectively as beam-house operations, to prepare the hides for tanning. These steps include the removal of hair, the epidermis and endodermis and to bring the hides to an appropriate pH to undergo tanning.

During tanning, chemicals referred to as tanning agents or tannins are used to bond to specific chemical sites on the protein chains (collagen) in the hide; thus altering the physical and chemical properties of the hide. The leather tanning process involves the use of tanning agents to bond to the collagen in order to create branches or crosslinks with other protein chains. Tanning is usually performed in two or more distinct stages, known as the "tanning" and "re-tanning" stages, where typically different tanning agents are used to bond to different chemical sites on the collagen. By bonding to different sites on the collagen, this has the effect of improving the physical properties of the leather by increasing its durability. The tanning and re-tanning stages each take typically tens of hours, or even days to complete.

Leather tanning is an active area of research, where new tanning agents are sought as this will affect the properties of the finished product. One limitation on the tanning agents that can be used is their chemical stability. Since the tanning and re-tanning stages occur over many hours, some tanning agents are too unstable and would react with water, air, etc. before the tanning agents are able to bond to the collagen.

Some countries have a specific problem with the environmental impact of leather tanning due to the potentially hazardous chemicals used in the production process and where local environmental protection laws either do not exist or are not enforced effectively. In such areas, a technology which could either reduce the toxicity and/or volume of effluent discharge produced by the tanneries would be highly desirable, especially if this technology were capable of introducing an economic benefit to the tannery.

The present invention provides a process and system for the production of tanned animal hide. The process greatly reduces the time associated with tanning animal hides compared to conventional tanning processes. The power required for the present invention is significantly less than for conventional tanning processes. The amount of waste product (in particular waste-water) generated through the process of the present invention is also substantially less than conventional tanning processes, and the associated environmental impact of the processes of the present invention is minimised accordingly.

SUMMARY OF THE INVENTION

According to a first aspect of the present invention there is provided a process for tanning animal hide comprising:
  treating an animal hide with at least one tanning agent;
  exposing the treated hide to a dose of ionising radiation of from 1 to 500 kJ/kg wherein the ionising radiation is not in the form of ultraviolet light. In particular, the ionising radiation does not consist of photons, suitably the ionising radiation does not consist essentially of photons, typically the ionising radiation does not consist of photons The ionising radiation generally comprises, or consists essentially of charged particles, suitably one or more of electrons and protons; typically, electrons. According to one embodiment, the ionising radiation is in the form of a charged particle beam.

Generally the ionising radiation does not consist or consist essentially of photons.

Ionising radiation, especially radiation including charged particles such as radiation from a charged particle beam, substantially increases the reactivity of proteins in animal hides as well as in tanning agents by ionising chemical sites, resulting in significantly faster tanning processes. For instance, a hide can be tanned in minutes, or even less using the process of the present invention as opposed to hours or days as is the case for conventional tanning processes. Generally a hide can be tanned in 1 to 10 minutes according to the method of the present invention.

The animal hide is treated with at least one tanning agent, suitably by soaking the animal hide in a formulation comprising at least one tanning agent. Following removal of the treated hide from the formulation, the formulation may be reused and recycled for the treatment of further animal hide. Substantially smaller quantities of waste-water may thus be generated compared to conventional tanning processes.

Tanning is in contrast to initial treatment and curing of skins and hides. Skins and hides are typically treated and cured at or near to the slaughterhouse in order to prepare the skins and hides for transport to the tannery and generally for storage for up to 6 months. The underlying processes of tanning and curing are substantially different.

According to a further aspect of the present invention, there is provided a process for re-tanning tanned animal hide comprising:
  treating a tanned animal hide with at least one re-tanning agent;
  exposing the treated hide to a dose of ionising radiation of from 1 to 500 kJ/kg, wherein the ionising radiation comprises charged particles, generally wherein at least 75% of the ionising radiation is in the form of charged particles.

According to a further aspect of the present invention, there is provided a process for tanning and/or retanning animal hide and fixing dye to animal hide comprising:
  treating an animal hide with at least one tanning agent;
  contacting the treated hide with dye;
  exposing the treated hide to a dose of ionising radiation of from 1 to 500 kJ/kg wherein the ionising radiation comprises charged particles, generally wherein at least 75% of the ionising radiation is in the form of charged particles.

According to a further aspect of the present invention, there is provided a system for tanning animal hide including a container for housing a formulation including at least one tanning agent or for housing a formulation including at least one re-tanning agent and an ionising radiation source such as a particle accelerator, or a radioactive source, in particular an electron accelerator. The ionising radiation source is advantageously a source of charged particles such as electrons or protons.

Throughout the Application, where a process is described as having, including, or comprising specific process steps, or where a formulation or system is described as having, including, or comprising specific components, it is contemplated that the process of the present teachings also consists essentially of, or consists of, the recited process steps and that the formulation or system also consists essentially of, or consists of, the recited components. Where appropriate, teaching relating to any aspect or embodiment may relate to any other embodiment.

In the Application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a device, formulation or a process described herein can be combined in a variety of ways without departing from the spirit and scope of the present teachings, whether explicit or implicit herein.

It should be understood that the expression "at least one of" includes individually each of the recited objects after the expression and the various combinations of two or more of the recited objects unless otherwise understood from the context and use.

The use of the singular herein, for example, "a," "an," and "the," includes the plural (and vice versa) unless specifically stated otherwise.

The use of the terms "include," "includes", "including,", "comprise", "comprises" "comprising", "have," "has," or "having" should be generally understood as open-ended and non-limiting unless specifically stated otherwise.

The use of the singular herein includes the plural (and vice versa) unless specifically stated otherwise. All numerical values provided incorporate 10% less than and 10% more than the numerical value provided.

In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions may be conducted simultaneously.

Features, integers, characteristics, or groups described in conjunction with a particular aspect, embodiment or example of the invention are to be understood to be applicable to any other aspect, embodiment or example described herein unless incompatible therewith.

At various places in the present specification, values are disclosed in groups or in ranges. It is specifically intended that the description include each and every individual sub combination of the members of such groups and ranges and any combination of the various endpoints of such groups or ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

The use of any and all examples, or exemplary language herein, for example, "such as," "including," or "for example," is intended merely to illustrate better the present teachings and does not pose a limitation on the scope of the invention unless claimed. No language in the specification should be construed as indicating any non-claimed element as essential to the practice of the present teachings.

Process

According to a first aspect of the present invention there is provided a process for tanning animal hide comprising:
   treating an animal hide with at least one tanning agent;
   exposing the treated hide to a dose of ionising radiation of from 1 to 500 kJ/kg wherein the ionising radiation comprises charged particles, generally wherein at least 75% of the ionising radiation is in the form of charged particles, typically wherein the ionising radiation consists essentially of charged particles.

The charged particle may be an ion. The charged particle may be negatively or positively charged. Examples of positively charged particles include protons, atomic nuclei, positrons, cations. Examples of negatively charged particles include electrons, antiprotons and anions.

Examples of particles without an electric charge which fall outside the definition of a charged particle include photons and neutrons.

According to one embodiment, the ionising radiation comprises at least 90% charged particles; suitably at least 95%; typically 99 to 100% of the ionising radiation is in the form of charged particles.

According to one embodiment, the dose of ionising radiation is from 5 to 300 kJ/kg, suitably from 10 to 200 kJ/kg.

According to one embodiment, the dose of ionising radiation is 150 to 500 kJ/kg, suitably 200 to 450 kJ/kg, typically 300 to 400 kJ/kg.

According to an aspect of the present invention there is provided a process for tanning animal hide comprising:
   treating an animal hide with at least one tanning agent;
   exposing the treated hide to a dose of ionising radiation of from 125 to 500 kJ/kg, wherein the ionising radiation comprises or consists essentially of charged particles, generally from 150 to 450 kJ/kg, suitably from 200 to 400 kJ/kg, typically from 250 to 350 kJ/kg.

According to an aspect of the present invention there is provided a process for tanning animal hide comprising:
   treating an animal hide with at least one tanning agent;
   exposing the treated hide to a dose of ionising radiation of from 1 to less than 100 kJ/kg, wherein the ionising radiation comprises or consists essentially of charged particles, generally from 1 to 75 kJ/kg, suitably from 1 to 50 kJ/kg, typically from 1 to 40 kJ/kg.

During tanning, chemicals referred to as tanning agents or tannins are used to bond to specific chemical sites on the protein chains (collagen) in the hide; thus altering the physical and chemical properties of the hide. Tanning is usually performed in two or more distinct stages, known as the "tanning" and "re-tanning" stages, where typically different tanning agents are used to bond to different chemical sites on the collagen.

The term "hide" is used herein to refer to hides, skins or any other biological tissue that may be tanned.

The ionising radiation is generally in the form of one or more beams of charged particles, in particular, one or more substantially uni-directional beams of charged particles.

The ionising radiation may have an associated energy of 1 eV to 100 MeV; suitably 1 keV to 100 MeV; generally, 50 keV to 100 MeV, typically 1 to 10 MeV.

According to one embodiment, the ionizing radiation has an associated energy of 100 keV to 100 MeV.

The energy range of the ionising radiation is optimized to maximise the dose deposition rate. A high dose deposition rate minimizes energy consumption of the process whilst also minimizing the time required to tan the animal hide. The process disclosed herein may tan an animal hide in 1 to 10 minutes, typically 1 to 5 minutes compared to prior art processes which take at least 10 to 15 hours to tan an animal hide.

As well as maximizing the dose deposition rate, the charged particles of the ionising radiation must have sufficient energy to penetrate through the hide, ensuring that the interior of the hide is tanned.

According to one embodiment, the ionising radiation may be in the form of a beam of charged particles. The particles may be electrons, protons or ions; generally, electrons or ions. The ionising radiation may be an electron beam.

According to one embodiment there is provided a process for tanning animal hide comprising:
  treating an animal hide with at least one tanning agent;
  exposing the treated hide to a dose of ionising radiation of from 1 to 500 kJ/kg
wherein the ionising radiation is in the form of a charged particle beam (especially an electron beam) having an associated energy of 100 keV to 100 MeV; suitably 1 to 10 MeV.

According to one embodiment there is provided a process for tanning animal hide comprising:
  treating an animal hide with at least one tanning agent;
  exposing the treated hide to a dose of ionising radiation of from 150 to 500 kJ/kg, suitably 200 to 450 kJ/kg, typically 300 to 400 kJ/kg;
wherein the ionising radiation is in the form of a charged particle beam (especially an electron beam) having an associated energy of 100 keV to 100 MeV; suitably 1 to 10 MeV.

According to one embodiment there is provided a process for tanning animal hide comprising:
  treating an animal hide with at least one tanning agent;
  exposing the treated hide to a dose of ionising radiation of from 1 to less than 100 kJ/kg, generally from 1 to 75 kJ/kg, suitably from 1 to 50 kJ/kg, typically from 1 to 40 kJ/kg;
wherein the ionising radiation is in the form of a charged particle beam (especially an electron beam) having an associated energy of 100 keV to 100 MeV; suitably 1 to 10 MeV.

The ionising radiation may be generated from a radioactive source. In such embodiment, the radiation may be in the form of alpha-, beta- or gamma-rays, typically having an associated energy of 100 keV to 100 MeV.

The source of the ionising radiation may be any device capable of emitting ionising radiation, in particular a source of charged particles. Exemplary sources include a particle accelerator, or a radioactive source; although any appropriate device capable of emitting the correct dose of ionising radiation may be used. Suitably the source is a particle accelerator, in particular an electron accelerator. The ionising radiation may be emitted from more than one source.

According to one embodiment, the hide may be exposed to ionising radiation from different sources, contacting the hide from different directions or contacting different areas of the hide.

According to one embodiment, the hide is exposed to ionising radiation from more than one source, for instance more than one beam of ionising radiation. In such embodiment, the total dose of ionising radiation from all sources is from 1 to 500 kJ/kg.

Typically the dose of ionising radiation is from 5 to 300 kJ/kg, suitably from 10 to 200 kJ/kg, generally from 30 to 100 kJ/kg.

According to one embodiment, the dose of ionising radiation is from 150 to 500 kJ/kg, suitably 200 to 450 kJ/kg, typically 300 to 400 kJ/kg.

According to a further embodiment, the dose of ionising radiation is from 1 to less than 100 kJ/kg, generally from 1 to 75 kJ/kg, suitably from 1 to 50 kJ/kg, typically from 1 to 40 kJ/kg.

According to one embodiment, the dose of ionising radiation is 150 to 500 kJ/kg, suitably 200 to 450 kJ/kg, typically 300 to 400 kJ/kg.

The ionising radiation may penetrate between about 50% and about 100% of the thickness of the hide. Suitably, the hide has a thickness of 0.1 to 2.0 cm.

Where the hide is exposed to radiation from one side, the ionising radiation may have sufficient energy to penetrate 100% of the thickness of the hide.

Where the hide is exposed to radiation from both sides, the ionising radiation may have sufficient energy to penetrate 50% to 60% of the thickness of the hide.

The hide may be exposed to more than one beam of ionising radiation, in particular more than one beam of charged particles. Alternatively or additionally, the hide may be exposed to radiation from more than one source including at least one source which is not in the form of a beam of ionising radiation.

According to one embodiment, the hide may be exposed to one or more sources of ionising radiation in the form of a beam and to one or more sources of ionising radiation which are not in the form of a beam.

To irradiate a part or all of the hide, the ionising radiation (or the source thereof) and the hides may be moved relative to each other to produce a substantially uniform dose distribution of ionising radiation across the surface area of the hides and preferably through the volume of the hides. Possible configurations include moving the hides longitudinally at a constant speed through the ionising radiation and/or moving the beam horizontally across the hide. Alternatively or additionally, the hides may be passed through a wide beam of ionising radiation.

According to one embodiment, the ionising radiation is in the form of a beam of charged particles and the beam is rastered across the surface area of the hide to produce a substantially uniform dose distribution.

According to a further embodiment, the ionising radiation is in the form of a wide, static beam of charged particles and the hide is moved therethrough at a constant speed to produce a substantially uniform dose distribution across the surface area of the hide.

A plurality of hides and skins may be partially or completely stacked or overlapped and exposed to ionising radiation simultaneously.

Suitably, the hide is provided on a surface inclined from the horizontal (generally inclined from the horizontal by 10 to 30 degrees), and/or a non-planar surface such that the angle of incidence of the ionising radiation beam of charged particles on the surface of the hide can be controlled. Typically the surface is moveable to move the hide relative to the ionising radiation source.

According to one embodiment, the hides and radiation source are moved relative to each other at a linear speed of from 1 to 100 cm/sec, generally 1 to 50 cm/sec, suitably 1 to 10 cm/sec, typically 1 to 5 cm/sec.

If a high energy radiation source is used or if multiple radiation sources are provided, the hides and radiation source may be moved relative to each other at a higher linear speed, for example 50 to 100 cm/sec, suitably 75 to 100 cm/sec.

The hide may be placed in a container such as a bag or tray prior to exposure with ionising radiation.

The animal hide is generally treated with a formulation including at least one tanning agent, suitably an aqueous solution including at least one tanning agent. According to one embodiment, the hide is soaked in the formulation, alternatively or additionally, the formulation may be applied to the surface (s) to be treated, suitably through spraying or through application by a roller or spatula.

The hides will generally be contacted with the formulation for sufficient time to achieve a substantially uniform concentration of tanning agent(s) throughout the volume of the hides. Suitably, the hides are contacted with the formulation for 1 to 1440 minutes, generally 1 to 1000 minutes, typically 1 to 500 minutes, preferably 1 to 240 minutes depending upon the nature and characteristic of the hides, the concentration of the formulation as well as the requirements of the finished product. Typically the hides are contacted with the formulation for at least 10 minutes, generally at least 30 minutes. Multiple tanning agents may be used in order to perform multiple tanning stages and/or other processes in a single treatment step. According to one embodiment, re-tanning agents are included in the formulation allowing tanning and re-tanning to be conducted in a single step.

The formulation generally includes 1 to 99 vol. % tanning agent depending on the requirements of the finished product to be formed from the treated hide.

Suitable tanning agents would be well known to the skilled man and mention may be made of chromium (III) compounds, metallic compounds, aldehydes and vegetable tannins in this regard. Vegetable tanning agents are becoming increasingly popular due to environmental concerns, including extracts from trees, bark and fruit. Chrome-free synthetic tanning agents may also be used.

The treated hides are generally removed from the formulation after contact for a time sufficient to achieve a substantially uniform concentration of tanning agent(s) throughout the volume of the hides. According to one embodiment, the formulation may then be used to treat further hides. This allows use of the formulation for numerous batches of hides which reduces the expense as well as the associated waste.

Suitably the treated hide is exposed to ionising radiation within around 30 minutes or less from removal of the hide from the formulation including at least one tanning agent, generally around 10 minutes or less, suitably around 5 minutes or less, typically around 2 to 3 minutes from removal.

Generally the treated hide is exposed to ionising radiation for 0.1-10 seconds per kg hide.

According to one embodiment, the process of tanning disclosed herein takes 0.5 to 300 minutes, suitably 0.5 to 100 minutes, typically 1 to 30 minutes, generally 1 to 10 minutes, preferably 1 to 5 minutes.

The process of the present invention typically uses 0.2-140 kWh/kg hides treated. This is significantly less power than conventional tanning processes which tend to use around 1-1000 kWh/kg hides treated.

The process described here may include the step of re-tanning the tanned animal hide obtained according to the method of the present invention. The re-tanning step involves contacting the treated animal hide with at least one re-tanning agent. The hide treated with the re-tanning agent may also be exposed to a dose of ionising radiation of from 1 to 500 kJ/kg, wherein the ionising radiation comprises or consists essentially of charged particles. Alternatively, the re-tanning steps may be in accordance with conventional re-tanning processes.

According to one embodiment, tanning and non-tanning stages (for instance dyeing) are combined into a single step to exploit the use of ionising radiation.

Additionally or alternatively, the process described here may include the step of fixing dye to an animal hide. The treated hide may be contacted with a dye before or after exposure to a dose of ionising radiation of from 1 to 500 kJ/kg, wherein the ionising radiation comprises or consists essentially of charged particles, for instance from 1 to less than 100 kJ/kg, generally from 1 to 75 kJ/kg, suitably from 1 to 50 kJ/kg, typically from 1 to 40 kJ/kg.

According to one embodiment, the dose of ionising radiation is 150 to 500 kJ/kg, suitably 200 to 450 kJ/kg, typically 300 to 400 kJ/kg.

The ionising radiation may have an associated energy of 1 eV to 100 MeV; suitably 1 keV to 100 MeV; generally, 50 keV to 100 MeV, typically 1 to 10 MeV.

According to one embodiment, the process may comprise:
treating an animal hide with at least one tanning agent;
exposing the treated hide to a dose of ionising radiation of from 1 to 500 kJ/kg wherein the ionising radiation comprises or consists essentially of charged particles, for instance from 1 to less than 100 kJ/kg, generally from 1 to 75 kJ/kg, suitably from 1 to 50 kJ/kg, typically from 1 to 40 kJ/kg;
treating the animal hide with at least one re-tanning agent;
exposing the treated hide to a dose of ionising radiation of from 1 to 500 kJ/kg wherein the ionising radiation comprises or consists essentially of charged particles for instance from 1 to less than 100 kJ/kg, generally from 1 to 75 kJ/kg, suitably from 1 to 50 kJ/kg, typically from 1 to 40 kJ/kg.

According to one embodiment, the dose of ionising radiation for one or both of the tanning and re-tanning steps may be 150 to 500 kJ/kg, suitably 200 to 450 kJ/kg, typically 300 to 400 kJ/kg.

Suitably the ionising radiation used following treatment with the at least one tanning agent is in the form of a (charged particle beam (such as an electron beam) having an associated energy of 100 keV to 100 MeV; suitably 1 to 10 MeV.

Typically, the ionising radiation used following treatment with the at least one re-tanning agent is in the form of a charged particle beam (such as an electron beam) having an associated energy of 100 keV to 100 MeV; suitably 1 to 10 MeV.

Generally, the dose of ionising radiation is from 1 to less than 100 kJ/kg, and the ionising radiation is in the form of a charged particle beam (such as an electron beam) having an associated energy of 1 to 10 MeV.

According to one embodiment, the dose of ionising radiation is 150 to 500 kJ/kg, and the ionising radiation is in the form of a charged particle beam (such as an electron beam) having an associated energy of 1 to 10 MeV.

According to a further embodiment, the process may comprise
- treating an animal hide with at least one tanning agent;
- exposing the treated hide to a dose of ionising radiation of from 1 to 500 kJ/kg, wherein the ionising radiation comprises charged particles, for instance from 1 to less than 100 kJ/kg, generally from 1 to 75 kJ/kg, suitably from 1 to 50 kJ/kg, typically from 1 to 40 kJ/kg;
- treating an animal hide with at least one dye;
- exposing the treated hide to a dose of ionising radiation of from 1 to 500 kJ/kg, wherein the ionising radiation comprises charged particles, for instance from 1 to less than 100 kJ/kg, generally from 1 to 75 kJ/kg, suitably from 1 to 50 kJ/kg, typically from 1 to 40 kJ/kg;
- optionally treating the animal hide with at least one re-tanning agent;
- optionally exposing the treated hide to a dose of ionising radiation of from 1 to 500 kJ/kg, wherein the ionising radiation comprises charged particles, for instance from 1 to less than 100 kJ/kg, generally from 1 to 75 kJ/kg, suitably from 1 to 50 kJ/kg, typically from 1 to 40 kJ/kg.

According to one embodiment, the dose of ionising radiation for one or more of the tanning dying and re-tanning steps may be 150 to 500 kJ/kg, suitably 200 to 450 kJ/kg, typically 300 to 400 kJ/kg.

Suitably the ionising radiation used following treatment with the at least one tanning agent, the ionising radiation used following treatment with the at least one dye, and/or the ionising radiation used following treatment with the at least one re-tanning agent is in the form of a charged particle beam (such as an electron beam) having an associated energy of 100 keV to 100 MeV;

Suitably the ionising radiation used following treatment with the at least one tanning agent, the ionising radiation used following treatment with the at least one dye, and/or the ionising radiation used following treatment with the at least one re-tanning agent is in the form of a charged particle beam (such as an electron beam) having an associated energy of suitably 1 to 10 MeV.

According to a further aspect of the present invention, there is provided a process for re-tanning tanned animal hide comprising:
- treating a tanned animal hide with at least one re-tanning agent;
- exposing the treated hide to a dose of ionising radiation of from 1 to 500 kJ/kg, wherein the ionising radiation comprises charged particles, for instance from 1 to less than 100 kJ/kg, generally from 1 to 75 kJ/kg, suitably from 1 to 50 kJ/kg, typically from 1 to 40 kJ/kg.

According to one embodiment, the dose of ionising radiation may be 150 to 500 kJ/kg, suitably 200 to 450 kJ/kg, typically 300 to 400 kJ/kg.

Typically, the ionising radiation used following treatment with the at least one re-tanning agent is in the form of a charged particle beam (such as an electron beam) having an associated energy of 100 keV to 100 MeV; suitably 1 to 10 MeV.

The animal hide is generally contacted with a formulation including one or more re-tanning agents, such as aldehydes, aluminium, zirconium, titanium and/or iron salts. The formulation is generally an aqueous solution.

The timing and conditions of the re-tanning process is similar to the tanning process provided above. In addition, the step of exposing the treated hide to a dose of ionising radiation is generally in accordance with the exposure step described above in connection with the tanning process.

According to a further aspect of the present invention, there is provided a process for fixing dye to animal hide comprising:
- treating an animal hide with at least one tanning agent;
- contacting the treated hide with dye;
- exposing the treated hide to a dose of ionising radiation of from 1 to 500 kJ/kg, wherein the ionising radiation comprises charged particles, for instance from 1 to less than 100 kJ/kg, generally from 1 to 75 kJ/kg, suitably from 1 to 50 kJ/kg, typically from 1 to 40 kJ/kg.

According to one embodiment, the dose of ionising radiation during one or both of the tanning and re-tanning steps may be 150 to 500 kJ/kg, suitably 200 to 450 kJ/kg, typically 300 to 400 kJ/kg.

Typically, the ionising radiation is in the form of a charged particle beam (such as an electron beam) having an associated energy of 100 keV to 100 MeV; suitably 1 to 10 MeV.

System

According to a further aspect of the present invention, there is provided a system for tanning animal hide including a container for housing a formulation including at least one tanning agent or for housing a formulation including at least one re-tanning agent and an ionising radiation source, in particular a particle delivery apparatus such as a particle accelerator, or a radioactive source (in particular, a radioactive source that emits alpha-, beta- or gamma-rays).

The particle delivery apparatus is generally a particle accelerator, in particular an electron accelerator.

The system is generally suitable for use to effect the process described herein.

The system may include more than one ionising radiation source (typically an ionising radiation charge particle delivery device) which may be the same or different. The system typically includes more than one particle accelerators, in particular more than one electron accelerators.

The ionising radiation source may be provided in any orientation with respect to the hides to be irradiated. The system typically includes one or more devices to shape and/or steer the ionising radiation towards the hides, such as one or more electromagnets, and/or to minimise the distance through which the ionising radiation travels through the air before irradiating the hides, such as one or more beam horns.

The ionising radiation source may be a particle accelerator, in particular a linear particle accelerator. Suitably the ionising radiation source includes a beam transport line comprised of electromagnetic focusing magnets. The ionising radiation source may also include a beam raster magnet suitable to sweep the beam across a relatively wide area and/or a dipole magnet suitable to direct the beam.

According to one embodiment, the system includes more than one ionising radiation source (in particular more than one charged particle source) to allow the hide to be exposed to ionising radiation from more than one direction. Suitably the sources are arranged to allow exposure from two directions separated by at least 90 degrees, generally by around 180 degrees.

The system generally includes a conveyor to effect relative movement between animal hide to be tanned and the ionising radiation source, typically in the form of a conveyor belt.

The system of the present invention may comprise a control system, typically including one or more sensors or sensor assemblies in communication with a controller. In response to input signals from the sensors, user commands from a user-input device and/or programmed subroutines and command sequences, a controller can manage independently the operations of the conveyor, and/or the ionising radiation sources. The controller can be software operating on a processor. However, it is within the scope of the present teachings to employ a controller that is implemented with one or more digital or analog circuits, or combinations thereof. In response to input signals from the sensors, user commands from a user-input device and/or programmed subroutines and command sequences, a controller can manage the operations of the conveyor (for instance the speed and direction thereof), and/or the ionising radiation sources (for instance, the intensity and energy of radiation emission, and/or the direction of radiation emission).

The sensor assemblies can, but do not necessarily, include a transducer in communication with the controller. The communication pathways will ordinarily be wired electrical signals, but any other suitable form of communication pathway can also be employed. That is, the sensor assemblies, control signal-receiving devices, and communication pathways herein can be of any suitable construction such as those known in the art.

BRIEF DESCRIPTION OF THE DRAWINGS

The present invention will now be described by way of example only with reference to the accompanying figures.

Figure 1:
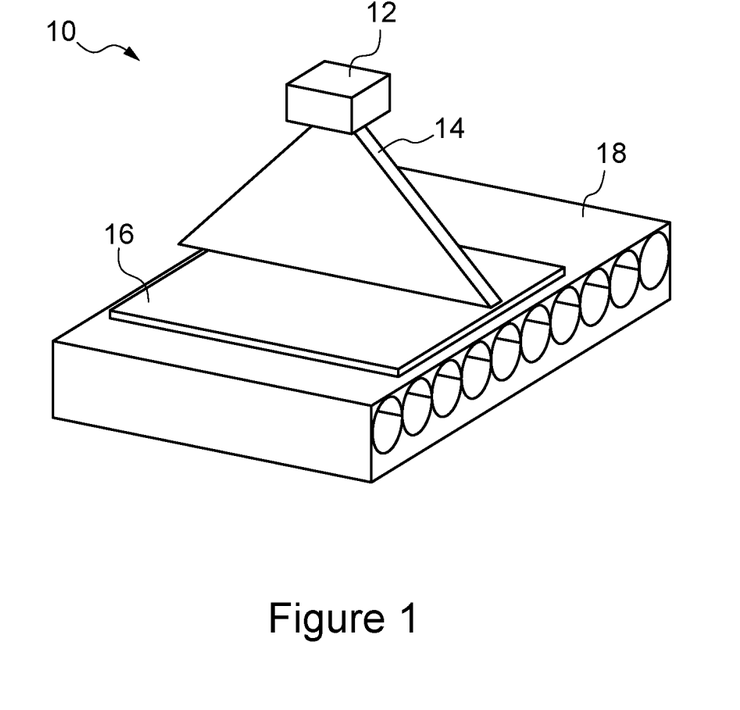
FIG. 1 is a schematic perspective view of a first embodiment of a particle delivery system used to irradiate hides for tanning according to the present invention.

A particle delivery system to irradiate hides for tanning according to a first embodiment of the present invention, generally designated 10, is shown schematically in FIG. 1, referred to herein as the system for tanning animal hide. The system for tanning animal hide 10 comprises a container for housing a formulation including at least one tanning agent (not shown) and an ionising radiation source 12, provided in FIG. 1 as a beam delivery system. The system 10 includes a beam horn 14 to minimise the distance the ionising radiation travels through the air before irradiating the hides 16. The hides are passed through the ionising radiation on a conveyor system 18.

Figure 2:
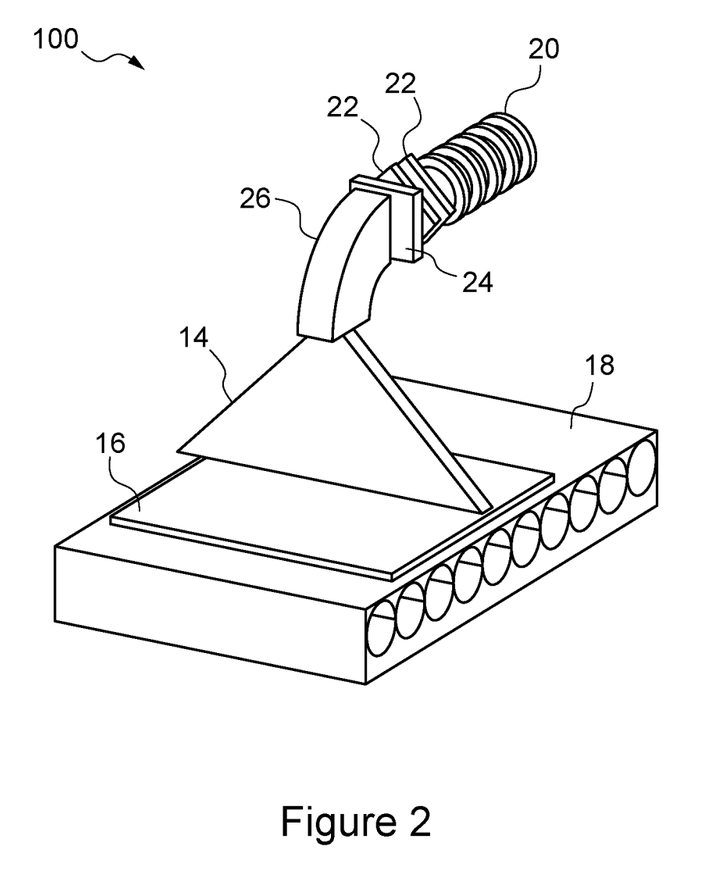
FIG. 2 is a schematic perspective view of a second embodiment of a particle delivery system used to irradiate hides for tanning according to the present invention.
Figure 3:
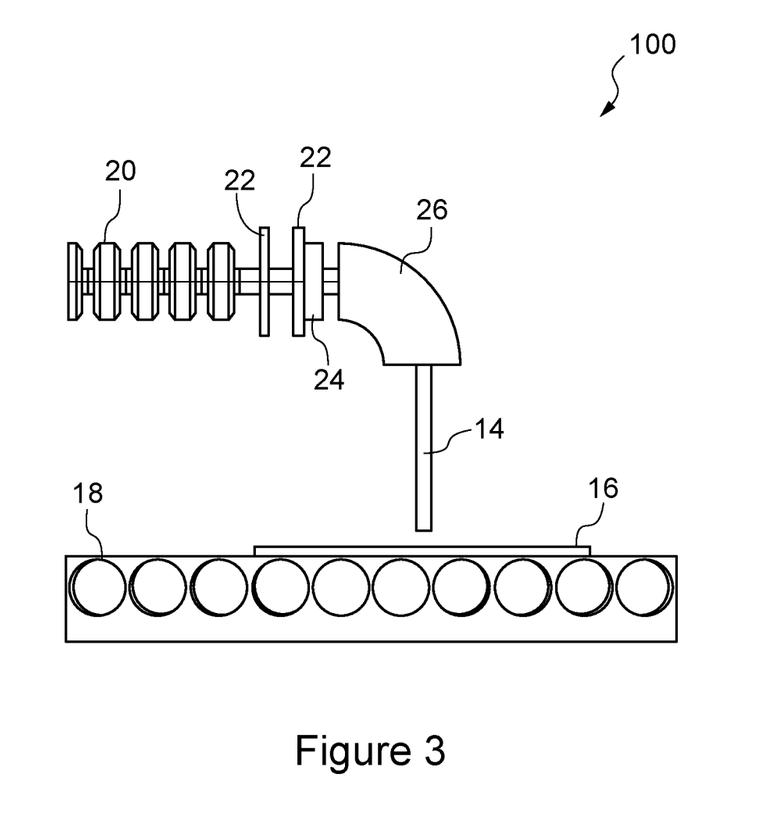
FIG. 3 is a schematic left side view of the particle delivery system used of FIG. 2.

A second embodiment of a system for tanning animal hide according to the invention, generally designated 100, is shown in a schematic perspective and left side view in FIGS. 2 and 3. The second embodiment of the beam tanning system 100 is substantially the same as the first embodiment of the beam tanning system 10, and differs only in the replacement of the beam delivery system 12 with a linear particle accelerator 20; and a beam transport line comprised of electromagnetic focusing magnets 22; a beam raster magnet 24 to sweep the beam across the width of the hide 16; and a dipole magnet 26 to direct the beam toward the hide 16.

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following Claims.

The invention claimed is:

1. A process for tanning animal hide comprising:
   treating an animal hide with at least one tanning agent to form a treated hide; and
   exposing the treated hide to a dose of ionising radiation of from 1 to 500 kJ/kg
   wherein the dose of ionising radiation comprises charged particles.

2. The process as claimed in claim 1, wherein the ionising radiation consists essentially of charged particles.

3. The process as claimed in claim 1 wherein the ionising radiation has an associated energy of 1 eV to 100 MeV.

4. The process as claimed in claim 1 wherein the ionising radiation is in the form of an electron beam or an ion beam having an associated energy of 1 to 10 MeV.

5. The process as claimed in claim 1 wherein the dose of ionising radiation is from 1 to less than 100 kJ/kg.

6. The process as claimed in claim 1 wherein the dose of ionising radiation is from 150 to 500 kJ/kg.

7. The process as claimed in claim 1 wherein the ionising radiation is emitted from a source and the hides and the source are moved relative to each other at a linear speed of from 1 to 50 cm/sec.

8. The process as claimed in claim 1 wherein the hide is provided on a surface inclined from the horizontal by 10 to 30 degrees, and/or on a non-planar surface.

9. The process as claimed in claim 1 wherein the hide is treated with a formulation comprising at least one tanning agent for a time sufficient to achieve a substantially uniform concentration of tanning agent(s) throughout the hide; and the hide is exposed to the dose of ionising radiation within 30 minutes of removal from the formulation.

10. The process as claimed in claim 9 wherein the formulation is used to treat numerous batches of hide.

11. The process as claimed in claim 1 having a duration of 0.5 to 10 minutes.

12. The process as claimed in claim 1 having an associated power usage of 0.2-140 kWh/kg hides treated.

13. The process as claimed in claim 1 further comprising:
    treating the animal hide with at least one re-tanning agent; and
    exposing the treated hide to a dose of ionising radiation of from 1 to 500 kJ/kg wherein the ionising radiation comprises charged particles.

14. The process as claimed in claim 13 wherein the dose of ionising radiation is from 1 to less than 100 kJ/kg, and the ionising radiation is in the form of a charged particle beam having an associated energy of 1 to 10 MeV.

15. The process as claimed in claim 1 further comprising:
    treating an animal hide with at least one dye;
    exposing the treated hide to a dose of ionising radiation of from 1 to 500 kJ/kg wherein the ionising radiation comprises charged particles;
    optionally treating the animal hide with at least one re-tanning agent; and
    optionally exposing the treated hide to a dose of ionising radiation of from 1 to 500 kJ/kg wherein the ionising radiation comprises charged particles.

16. The process as claimed in claim 15 wherein the dose of ionising radiation is from 1 to less than 100 kJ/kg, and the ionising radiation is in the form of an electron beam having an associated energy of 1 to 10 MeV.

17. A process for re-tanning tanned animal hide comprising:
    treating a tanned animal hide with at least one re-tanning agent;

exposing the treated hide to a dose of ionising radiation of from 1 to 500 kJ/kg
wherein the ionising radiation comprises charged particles.

18. A process for tanning and/or retanning animal hide comprising:
   treating an animal hide with at least one tanning agent;
   contacting the treated hide with dye; and
   exposing the treated hide to a dose of ionising radiation of from 1 to 500 kJ/kg
wherein the ionising radiation comprises charged particles.

* * * * *